Dec. 20, 1960 G. W. DOWNS 2,965,434
RECORDING OSCILLOGRAPH
Filed April 1, 1957 3 Sheets-Sheet 1

INVENTOR.
GEORGE W. DOWNS
BY
ATTORNEY

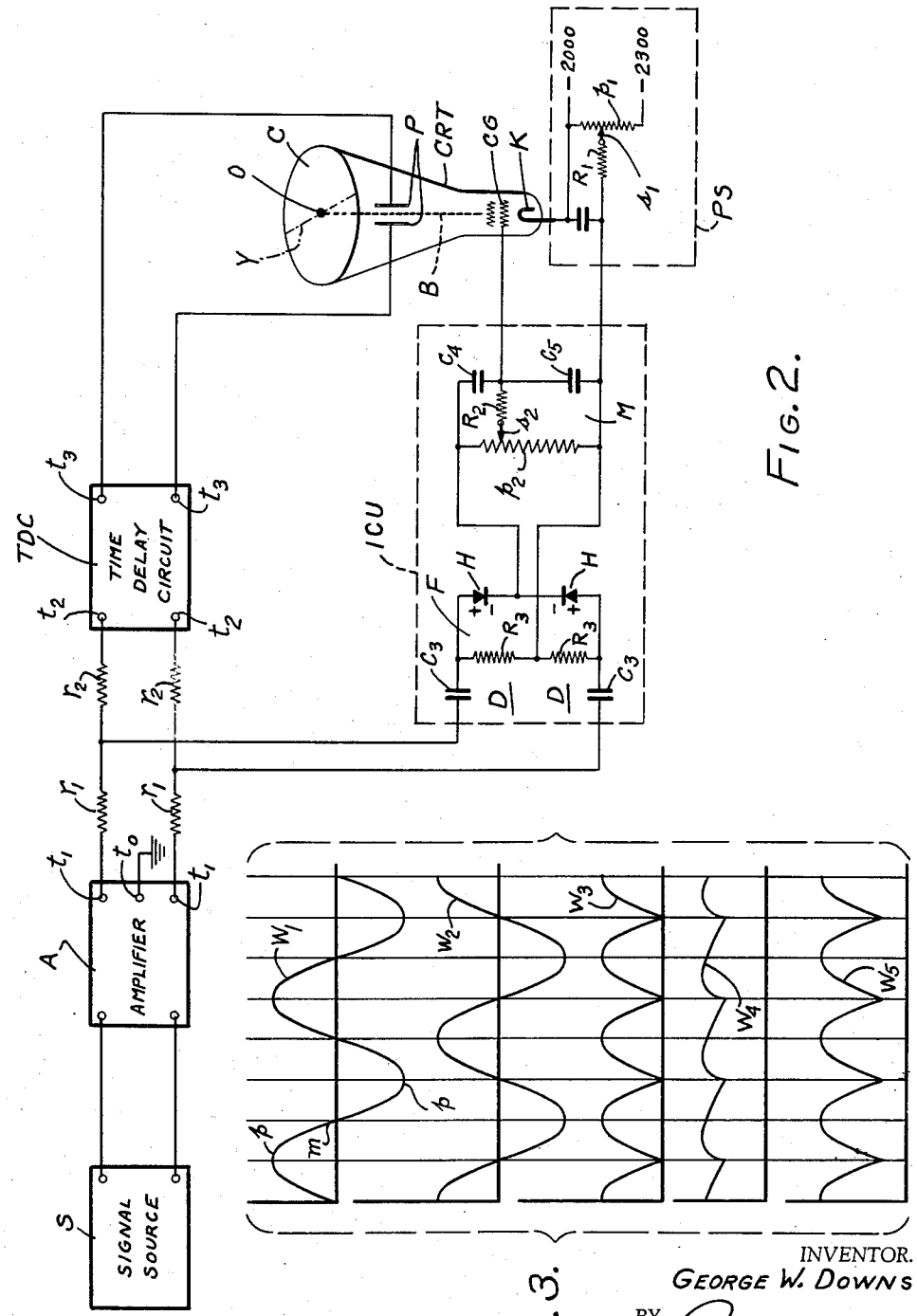

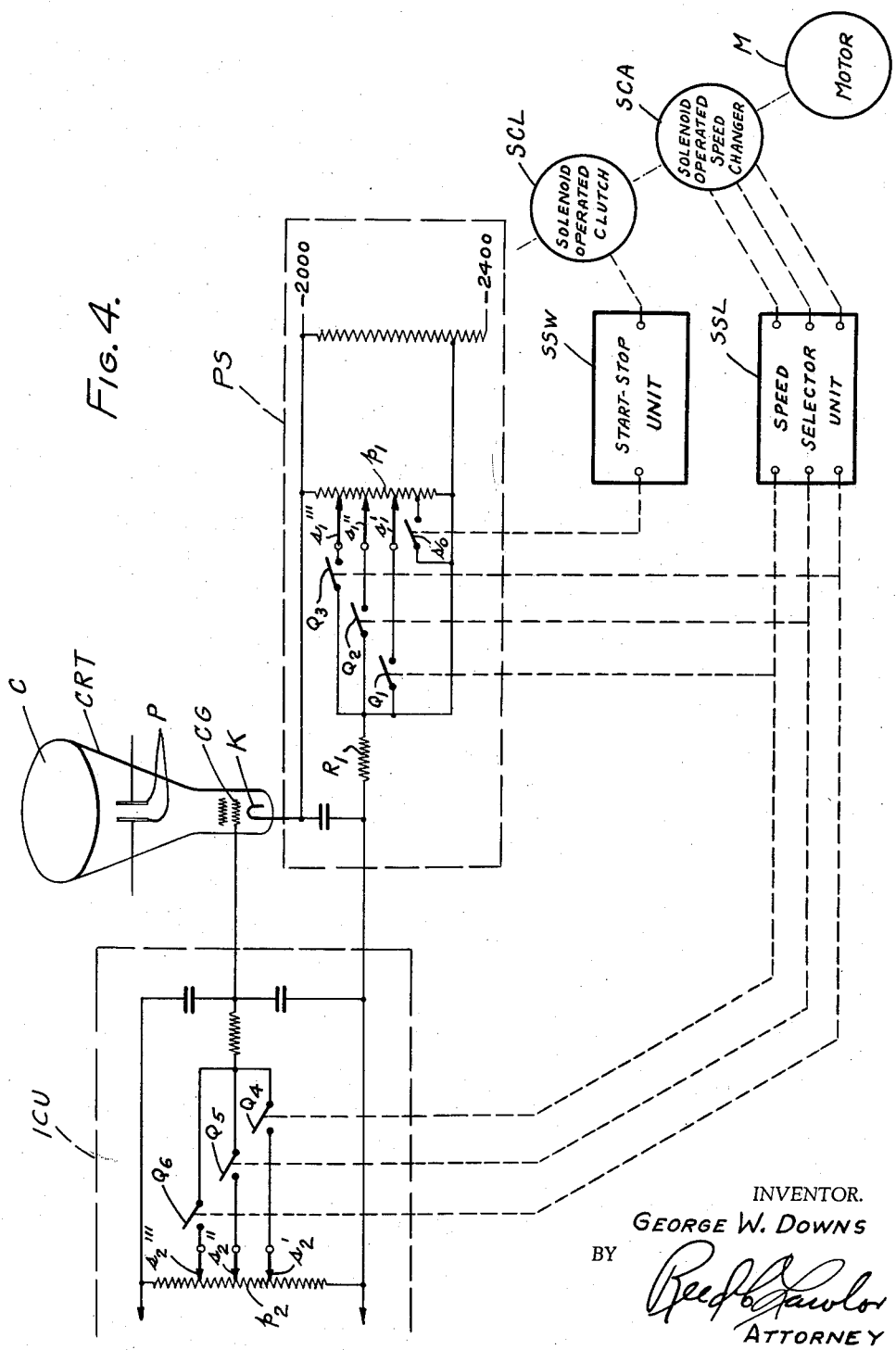

United States Patent Office 2,965,434
Patented Dec. 20, 1960

2,965,434

RECORDING OSCILLOGRAPH

George W. Downs, Altadena, Calif., assignor, by mesne assignments, to Consolidated Electrodynamics Corporation, Pasadena, Calif., a corporation of California Filed Apr. 1, 1957, Ser. No. 649,709

8 Claims. (Cl. 346—110)

This invention relates to improvements in oscilloscopes and particularly to oscilloscopes in which oscillograph traces are of more nearly uniform contrast relative to the background against which the traces appear.

Oscilloscopes are generally of two types. In one, an oscillograph trace is displayed visually but for only a relatively short time on a screen, usually for not more than a few minutes. Cathode ray tube oscilloscopes of this type are well known. Usually in such an arrangement the trace is produced by repeatedly moving the beam at "scanning speed" along a time-axis and simultaneously deflecting the beam in a direction about perpendicular to the time-axis by amounts that vary with the amplitude of the signal under investigation. In another type of oscilloscope, more commonly called an oscillograph, the trace is recorded permanently on photographic paper or other recording medium in visible form. In either type of oscilloscope the trace may be in the form of a bright trace against a dark background, or it may be in the form of a dark trace impressed on a light or bright background.

In the particular oscilloscope to which the invention has been applied as described hereinafter, an electron beam projected toward a screen of a cathode ray tube is deflected only along a specific deflection axis in accordance with the amplitude of applied signals, and the image of the bright spot produced on the screen is projected to an image position past which recording photographic paper is moved at a constant speed along a time axis. With such an oscilloscope, an oscillogram is produced in which the signal is recorded as a variable deflection as a function of time.

Oscilloscopes are employed to display traces which are characterized by widely different frequencies and widely different amplitudes. The speed of the electron beam or other spot which produces the trace depends on both the instantaneous amplitude and the frequency of the signal being recorded. It also depends on the scanning speed of the electron beam of the cathode ray oscilloscope or of the recording paper as the case may be. As a result, the intensity of a trace, or more broadly its contrast with the background, varies from point to point along the trace, and also varies from trace to trace when different traces have different amplitude or frequency characteristics. The lack of uniformity of the trace sometimes results in serious loss of information respecting the signal that is recorded.

More particularly, if the intensity of the spot is suitable for use with very low frequencies or very low amplitudes, then when the speed of the spot is high compared with the scanning speed, the display or record of the trace may be very feeble or even completely absent. As an example, when employing a cathode ray oscilloscope, the normal potentials of the control elements are adjusted to such a value that the beam does not burn out or otherwise injure the screen at any point where the beam may remain at rest while no signals are applied. Subsequently when a signal is applied the beam then moves across the face of the screen at an instantaneous speed that depends upon both the frequency of the signal and the instantaneous amplitude of the signal.

In such a case, when a sine wave is applied to the beam, and the scanning speed is low, the speed of the beam is a minimum at the peaks of the sine wave and is a maximum at the points where the sine wave intersects the time axis, that is, at the instants halfway between successive wave peaks. Consequently when a sine-wave signal is reproduced as as oscillograph trace, the contrast is greater at the peaks than elsewhere and is least at the points midway between the peaks. Similarly, when a transient pulse having a short rise-time or short fall-time is reproduced, the sharp parts of the pulse at the front or tail ends are weak and, in fact, often invisible.

The foregoing difficulties are encountered not only when employing a cathode ray oscilloscope for displaying a signal and not only when employing a cathode ray oscilloscope for producing a photographic oscillograph trace, but even when a galvanometer carrying a deflection mirror is employed to produce a trace in an ordinary photographic recording oscillograph. Even though such difficulties are present in other cases, the invention will be described particularly hereinafter with reference to a specific type of recording oscillograph in which the source of light which produces the oscillograph trace is a moving bright spot on the face of a cathode ray oscilloscope.

Accordingly the principal object of this invention is to provide an improved oscilloscope with which an oscillograph trace characterized by more uniform contrast can be produced.

Another object of the invention is to provide such an improved oscilloscope which utilizes auxiliary parts which are few in number and which increase the cost of the oscilloscope very little.

Another object of the invention is to provide such an improved oscilloscope which is capable of being used over a wide range of amplitudes and a wide range of frequencies.

The foregoing and other objects and advantages of the invention will appear more fully from a consideration of the description of one embodiment of the invention which follows. Although only one specific embodiment of the invention is illustrated in the accompanying drawing and is described herein in detail, it is to be expressly understood that the drawing and the description are illustrative only and that the invention is not limited thereto, but that the invention may be embodied in many other forms within the scope of the appended claims.

In the drawings:

Fig. 2 is a detailed wiring diagram of the circuit of Fig. 1;

Fig. 3 is a series of graphs employed to explain the operation of the invention; and Fig. 4 is a schematic diagram of a modification of the oscillograph of Fig. 1.

Figure 1:
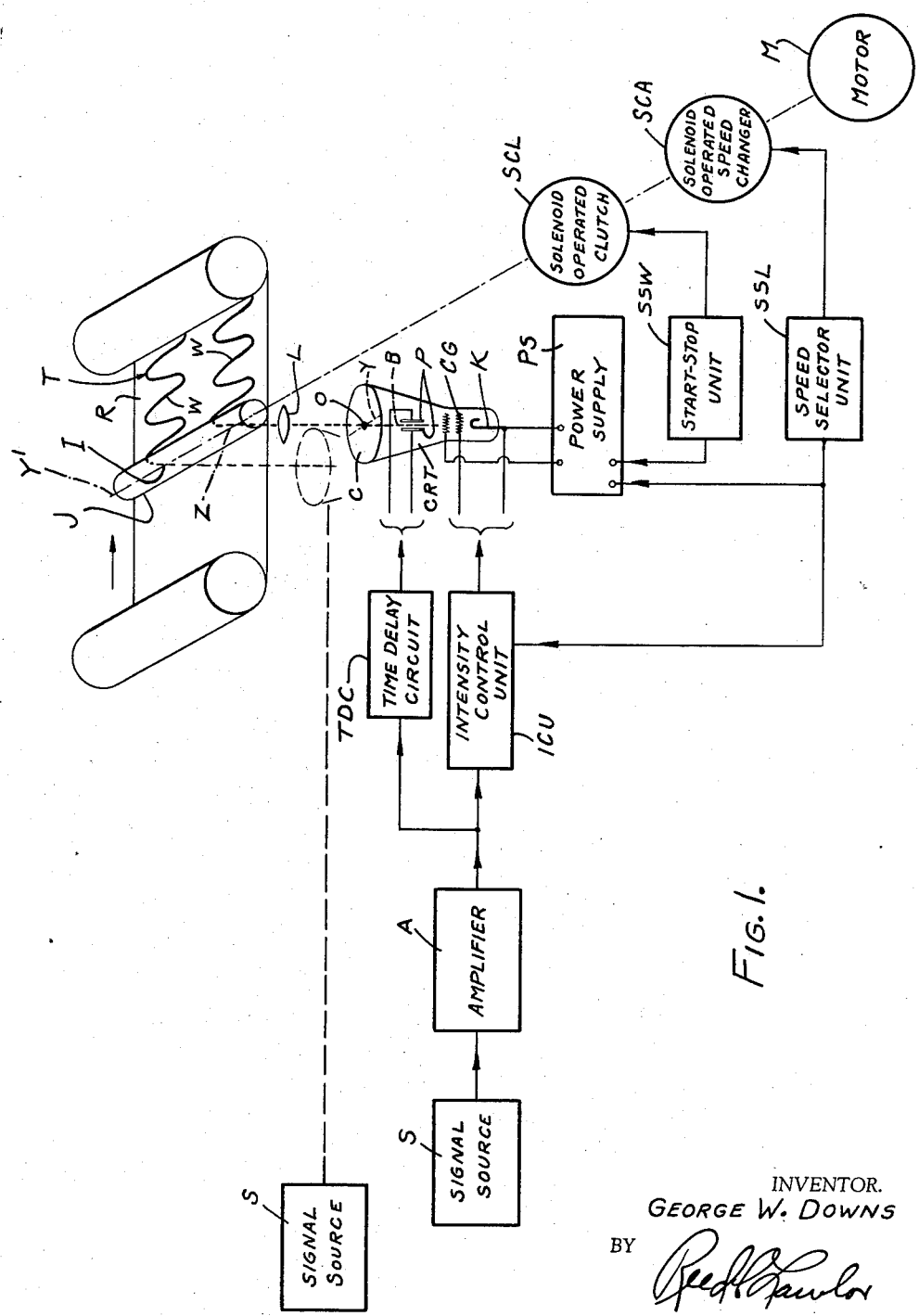
Fig. 1 is a schematic diagram of a recording oscillograph embodying my invention.

Referring to the drawing, and particularly to Fig. 1, there is illustrated an oscilloscope in the form of a multiple trace recording oscillograph. This oscillograph is of the general type described and claimed in Patent Number 2,614,460 which issued to William Miller Instruments, Inc. on October 12, 1952. In the oscillograph illustrated in Fig. 1, signals from each of a plurality of sources S are impressed upon a pair of electrostatic deflection plates P of a cathode ray oscilloscope tube CRT. In practice the signal from each source S is amplified by a push-pull amplifier A having a low output impedance prior to application to the deflection plates. The amplified signals thus cause an electron beam B to be deflected along a straight line on the inner surface of the face of the cathode ray tube. In effect the beam is deflected along a deflection axis Y in a "vertical" or ordinate direction, and since in this case no other deflecting forces are applied to the beam, there is no deflection of the beam along the time, or X, axis in a "horizontal" or abscissae direction.

Each of the cathode ray tubes CRT is of a type in which the part of the screen C struck by the beam B fluoresces or otherwise emits radiation while the beam is striking that part. In this embodiment of the invention a P11 or P4 phosphor is employed. In this case therefore, the screen is of the "fluorescent" type in which there is substantially no persistence. Consequently the screen radiates a small spot of light which travels with the electron beam B along the deflection axis Y simultaneously with the movement of the electron beam B across the screen. A cathode ray tube which has proved to be satisfactory for my purposes is a tube bearing the type number 3ABP11. Such a screen emits light having high actinic qualities while the electron beam is impinging thereon and the illumination from any spot diminishes rapidly when the beam moves from that spot. In effect the luminous spot moving up and down along the line Y is a moving source of light of nearly constant intensity.

An image of the cathode ray tube screen C is projected by means of an optical system, here represented simply by the lens L, to a recording zone Z past which a strip R of recording photographic paper is moved. An image I of the moving source O is thus moved along an axis Y' which is the conjugate image in the recording zone of the axis Y on the screen. The recording paper R is moved at constant speed in a direction perpendicular to the image axis Y', thus causing an oscillograph trace W of the signal from the source S to be recorded on the recording paper. The cathode ray tubes CRT and the optical systems L are so arranged that the signals from a plurality of sources S are recorded in side-by-side relationship so as to produce a multiple-trace oscillogram of conventional type in which signals occurring simultaneously in the sources are recorded simultaneously on the record paper so that simultaneously occurring events in the source are located one above the other along a line that is parallel to the width of the recording paper strip and is perpendicular to its length.

The present invention relates particularly to an improvement which makes it possible to produce oscillograph traces on the recording paper R which are of more nearly uniform intensity or contrast than has heretofore been obtained. In some oscillograms a dark or black trace is recorded against a gray or white background. In others a bright or white trace is recorded against a black or gray background. In either case greater contrast exists on the trace at the peaks $p$ and less contrast occurs elsewhere on the trace. In oscillograms produced heretofore the contrast at the peaks of the signals have been relatively great while the contrast of parts of the wave between the peaks have been relatively weak, sometimes not appearing at all. The reason for this objectionable phenomenon has long been well known.

In the present embodiment of the invention, the light spot O is bright against the dark background of the screen C while the recorded traces W are black against the neutral or light grey background of the unexposed part of the recording paper. The portions of the wave at the peaks $p$ are dark because the photographic exposure is greater there than at intervening points, and the portions of the waves at the intervening positions $m$ are lighter because the exposure there is less. In the oscilloscope illustrated in Fig. 1 it is clear that the exposure is greater at the peaks than at the intervening points and is less at the intervening points than at the peaks, because the velocity of travel of the spot O on the screen is zero at the peaks and is high at intervening positions.

The amplitude of a sine wave is given by the following formula:

$$y = a \sin \omega t \qquad (1)$$

where $y$ = deflection of the spot along the line Y from its normal or zero position;
$a$ = amplitude of the wave;
$\omega = 2\pi f$;
$f$ = frequency of the wave; and
$t$ = time.

Furthermore the speed of travel of the spot O on the screen C is given by the equation $$S = a\omega \cos \omega t$$

If the intensity of the electron beam B is constant, which it normally is in all prior cathode ray oscilloscopes, the apparent brightness or intensity of the spot O in terms of total luminous energy per unit area is large when the speed of the beam or spot is zero and also when the beam dwells at a spot for only a short time compared with the persistence time of vision. But on the other hand, when the intensity of the electron beam B is constant, the total luminous energy per unit area or apparent brightness is low when the speed of the beam is high. It is to be noted that the spot speed S is proportional to the amplitude of the wave and also to the frequency of the wave. The "apparent brightness" is thus a function of the time integral of the low brightness. This accounts for the variation in strength or contrast of the trace from spot to spot and for the well known fact that certain parts of recorded oscillograms are normally more difficult to see than others.

The exposure of the photographic paper R depends not only on the speed of the light spot O along a deflection axis Y but also on the scanning speed of the paper. The total effective speed of the spot is the speed relative to the paper itself. This speed is determined by the vector sum of the spot speed along the axis Y' and the scanning speed along the time axis. In a similar way, in an ordinary oscilloscope employed for visual display of a trace on a screen C, the speed of the spot on the screen is determined by the vector sum of the spot deflection velocity and the scanning velocity. In practice the range of contrast obtained depends on the range of total spot speed as thus determined vectorally. Significant and substantial differences in contrast occur where the spot deflection speed is large compared with the scanning speed.

In accordance with this invention, differences in trace contrast are reduced or even substantially eliminated by varying the intensity of the beam B and hence the intensity of the source of light O as a function of the speed so that the various parts of the trace are recorded with more nearly equal film exposure. With this invention the apparent intensity of the spot O is made more nearly constant regardless of the amount of deflection of the spot and regardless of the frequency of the signal. For the same reason, the exposure of the photographic paper is more nearly constant at all times, so that the various parts of the recorded trace are of more nearly uniform contrast.

In accordance with this invention, the signal from each source S is impressed upon an intensity control unit ICU which is employed to vary the intensity of the electron beam B and hence the intensity of the spot O. The intensity of the spot O is so varied as to produce greater uniformity of the apparent intensity of the spot O, greater uniformity in the exposure of the photographic paper R, and hence greater uniformity in the contrast of the trace T. Since all recording channels operate in the same way, only one will be described.

As shown in greater detail in Fig. 2, each intensity control unit ICU includes a combination of differentiator circuits D and full-wave rectifier F and a storage or demodulator circuit M. With this unit ICU the amplified signal is differentiated and then fully rectified. The rectified signal is then impressed upon the storage circuit M. And the output of the storage circuit is employed to control the intensity of the beam B.

At frequencies that are very low, the intensity of the beam B is varied instantaneously, but by only a small amount. At frequencies that are very high, the intensity of the beam is increased by a large amount to a substantially fixed value that depends on the amplitude of the signal but is independent of the beam speed. At intermediate frequencies the intensity of the beam B is of normal value when the speed of deflection of the spot is zero and is increased when the speed of deflection is increased. A time delay circuit TDC in the form of a low-pass filter is employed in the path between amplifier A and the plates P. This circuit delays the application of the high frequency signals to the deflecting plates P until the intensity of the beam B has been raised.

The signal amplifier A is of the push-pull type, having a grounded center tap $t_0$ and output terminals $t_1$ respectively. Two resistors $r_1$ and $r_2$ are connected in series between each output terminal $t_1$ and one input terminal $t_2$ of the time delay circuit TDC. The output terminals $t_3$ of the time delay circuit TDC are connected to the two deflection plates P respectively.

The electron beam B is energized by means of a potential applied from a suitable power supply PS. A potentiometer $p_1$ is included in the power supply PS. The positive end of this potentiometer is connected directly to the cathode K of the cathode ray tube. The control grid CG of the cathode ray tube CRT is connected through a resistor $R_2$ to a sliding contact $s_2$ of a potentiometer $p_2$. The negative end of this potentiometer $p_2$ is connected through a resistor $R_1$ through the sliding contact $s_1$ of the first-mentioned potentiometer $p_1$. The base or normal intensity of the beam B is established by adjustment of the slide $s_1$ of the potentiometer $p_1$. The base or normal beam intensity is established at a level such that there is little inclination of the screen C of the tube to burn out or otherwise become permanently injured when no signal is applied to the deflection plates P.

A balanced pair of differentiator networks D is connected across the output of the amplifier A. Each of the differentiator networks includes a differentiating capacitor $C_3$ and a differentiating resistor $R_3$. The two resistors $R_3$ are connected in series between the two condensers $C_3$ and they are coupled to the output of the push-pull amplifier A by connection of the condensers $C_3$ to the junctions between the resistors $r_1$ and $r_2$ in the signal line. Two diodes H are connected face to face in parallel with the two resistors $R_2$, the negative terminals or poles of the diodes being connected together. Thus the resistors $R_5$ and the diodes H form a full-wave rectifier F. The potentiometer $p_2$ is connected across the output of the full-wave rectifier F with the junction between the resistors $R_3$ connected to the negative end of potentiometer $p_2$ and to the sliding contact $s_1$ through the resistor $R_1$. Two condensers $C_4$ and $C_5$ are connected in series across the potentiometer $p_2$. The junction between the two capacitors $C_4$ and $C_5$ is connected to the slider $s_2$ through the resistor $R_1$ and also to the control grid CG. The potentiometer $p_2$, resistor $R_2$ and the capacitors $C_4$ and $C_5$ form the storage circuit M which includes an input circuit connected across the output of the full-wave rectifier F and an output circuit which is formed across the capacitor $C_5$ and connected between the control grid CG and the resistor $R_1$.

Generally speaking, the output of the full-wave rectifier F is applied across the potentiometer $p_2$ and a fraction of this voltage is applied to the control grid CG in accordance with the position of the slide $s_2$. Because of the nature of the connections, the voltage of the control grid CG is driven in a positive direction relative to its normal value whenever a signal is applied to the amplifier A, causing the intensity of the electron beam B to be increased and thus causing the intensity of the spot O to be increased compared with the normal values that the intensity of the beam and the intensity of the spot would have in the absence of the intensity control unit ICU. Thus it is seen that the intensity of the spot O is increased whenever the deflection speed of the spot across the screen is increased.

The action of the intensity control circuit can best be understood by separately considering the action at different frequencies.

Consider now the action of the intensity control unit when a relatively low frequency sinusoidal wave is applied from a signal source S. It will be noted that the signal impressed upon the intensity control unit ICU is a sine wave $W_1$ as indicated in Fig. 3. The differentiating network produces a signal across the resistors $R_3$ which is a cosine wave $W_2$. The cosine wave $W_2$ is the derivative of the sine wave $W_1$. The rectifiers H produce across the output of the full-wave rectifier F a sequence of half-wave pulses represented by the wave $W_3$. These pulses are all of the same polarity but are otherwise in phase with the cosine wave $W_2$. It will be noted that the rectified wave $W_3$ has a series of cusps of zero value at the instants when the wave $W_1$ reaches its peak value. For this reason the intensity of the beam B is its normal value when the speed of the spot O on the screen is zero, that is when the peaks of the waves are being reproduced. Likewise it will be noted that the half-wave pulses of the rectified wave $W_3$ attain their maximum values when the sine wave $W_1$ has a zero value. For this reason the electron beam B has a maximum intensity when the speed of the spot O is a maximum when the portions of the wave between the peaks $p$ are being recorded.

The action just described occurs substantially as described when the period of the signal is very low compared with the reciprocal of the time constant of each of the differentiating networks D. At very high frequencies differentiation does not occur, since the capacitors $C_3$ have substantially little or no effect on the signal applied across the resistors $R_3$. The potentiometer $p_2$ and the condensers $C_4$ and $C_5$ thus act as such frequencies as storage circuits in which demodulated signals appear. The demodulator M thus operates at such higher frequencies to apply a fluctuating D.C. bias to the control grid CG which is proportional to the amplitude of the signal.

Expressed differently, at such high frequencies a sawtooth wave $W_4$ appears across the output of the rectifier F thus causing the intensity of the beam B to be raised to a higher value than normal throughout the entire period of application of successive pulses of the signal wave $W_1$.

At high frequencies the two capacitors $C_4$ and $C_5$ divide the voltage appearing at the output of the rectifier F. Accordingly at the inception of a transient, the bias impressed upon the control grid CG changes at a high rate, thus increasing the intensity of the beam at a high rate. This makes it possible to record distinctly the short-rise portions of suddenly changing signals.

If only waves having frequencies of an intermediate frequency are supplied from the signal source S, a wave $W_5$ having a form intermediate between those of the waves $W_3$ and $W_4$ appears across the potentiometer $p_2$. In this wave $W_5$ the cusps do not reach zero, so that in effect a fluctuating D.C. voltage is impressed between the control grid CG and the cathode K.

Due to the action of the differentiators D the amplitude of the signal appearing across the resistors $R_3$ is small, the amplitude of the wave $W_5$ is of intermediate value, and the amplitude of the wave $W_4$ is large. Thus the average bias provided by the intensity control unit ICU increases with the frequency of the signals, thus having an effect which increases with frequency even though the amplitude of the signal is constant. For this reason the effectiveness of the intensity control unit increases with need.

Some time elapses before the voltage across the output of the rectifier attains its stationary pulsating or saw-tooth character as indicated by the shapes of the waves $W_3$, $W_4$ and $W_5$. This time constant is determined very largely by the resistance of the potentiometer $p_2$ and the values of the capacitances of the capacitors $C_4$ and $C_5$. In order to make it possible to record a trace of high contrast at high frequencies, a time delay circuit TDC is employed which is characterized by a time delay about equal to the time constant of the demodulator circuit M. The time delay circuit may be a series of low-pass filters having cut-off frequencies, each of which is about equal to twice the highest frequency of the signals to be reproduced. The time delay circuit TDC may also of course be in the form of an all-pass circuit, that is, a time delay circuit having substantially uniform attenuation. Such time delay circuits are well known in the art and need not be described here.

It is not necessary for differentiation to occur throughout the entire band of frequencies of the signals that are to be reproduced. The reason for this is that perfect correction of contrast by perfect control of apparent spot intensity to overcome effects due to variations of beam speed is not required. Nevertheless the networks D are called differentiators because normally they approximately differentiate over at least a large part of the band of frequencies of the waves being reproduced. Normally the time constant of each of the differentiator networks D is equal to about the period of waves near the middle of the band of waves that are to be reproduced and the time constants of the networks of the demodulator circuit are also but the same as the time constant of each of the differentiator networks.

In any event, while the differentiator is operative, the intensity of the beam B is varied in accordance with the speed of the spot O, the intensity increasing instantaneously with the speed of the spot and decreasing instantaneously with decrease in the speed of the spot. But at high frequencies, the intensity of the beam is increased throughout a period that is long compared with the periods of the waves.

A typical set of values which have been employed successfully when no time delay circuit TDC has been employed are as follows:

$p_2 = 1.0$ megohms
$R_2 = 0.5$ megohms
$R_3 = 150$ kilohms
$C_3 = 150$ μμf
$C_4 = 10$ μμf
$r_1 = 10$ ohms
$r_2 = 33$ kilohms With these particular circuit constants, it will be noted, the time constant of the storage circuit formed by the capacitor $C_5$ and the lower portion of the potentiometer $p_2$ is longer than the time constant of each of the differentiator networks D except when the slider $s_2$ is very near the negative end of the potentiometer $p_2$. Accordingly some storage action occurs with this circuit even in the range of frequencies in which differentiation occurs. As a result the cusps of wave $W_3$ do not reach zero but are in the form of the valleys of wave $W_5$ at a plateau above the zero-voltage level. A circuit having such constants has been employed satisfactorily in improving the recording of waves in a frequency range from 10 c.p.s. to 40,000 c.p.s.

In practice the slider $s_1$ is placed in a position where a record having satisfactory contrast is obtained even with waves of low frequency and low amplitude, and the slider $s_2$ is set in a position in which satisfactory contrast is obtained with waves of high frequency and high amplitude. In other words, in effect, the position of the slider $s_1$ determines the contrast when the spot O is stationary and the position of the slider $s_2$ determines the contrast when the spot speed is high. By setting the potentiometer to provide more nearly equal contrast at both high and low spot speeds, improvement is also obtained at intermediate spot speeds. In any event, even though exact compensation is not achieved, the loss of signal when the speed of the spot is high is substantially eliminated. By employing the time delay circuit together with the intensity control circuit, very satisfactory contrast may be achieved with traces in both high frequency and low frequency regions. However, satisfactory results have been obtained even without the use of a time delay circuit.

Referring to Figs. 1 and 4, it is to be noted that the record paper R is driven by means of a capstan J driven by a motor M through a solenoid-operated speed changer SCA and a solenoid-operated clutch SCL. In practice, as shown more clearly in Fig. 4, the start-stop unit SSW is arranged in conventional manner to raise the bias applied to the cathode ray tube from a high value to a normal value by closing the switch $s_0$ at the same time that the solenoid-operated clutch SCL is closed. In this way the intensity of the beam is low when no signal at all is being recorded and the bias is increased to a normal value that depends on the speed of the paper when a recording is being made. For this purpose a speed selector is also used to control bias.

A speed selector unit SSL is employed to operate the solenoid-operated speed changer SCA. This speed changer is of a conventional type in which the speed of the capstan J may be selectively set at a number of predetermined values for a given predetermined speed of the motor M. The speed selector unit SSL is arranged to connect different sliders $s_1'$, $s_1''$, $s_1'''$ on the potentiometer $p_2$ to the resistor $R_1$ so as to establish the normal intensity of the beam B at a different value in accordance with the speed at which the record paper is to be driven. In other words, if the solenoid-operated speed changer is adapted to drive the capstan J at three speeds, then three sliders are employed and each of these is connected with the speed selector unit SSL so that a different normal voltage is applied to accelerate the electron beam B according to the speed of the paper. The bias supplied by the potentiometer $p_1$ is made smaller for higher paper speeds. In this way, for a low paper speed the intensity of the beam and hence the intensity of the spot O is relatively low, and for high paper speeds, the intensity of the beam B and the spot O is relatively high. In this way compensation for paper speed may be achieved, producing more nearly equal exposure of the photographic paper regardless of the paper speed.

The desired change in bias voltage with change of speed is achieved by means of normally open switches $Q_1$, $Q_2$ and $Q_3$ that are connected between the respective sliders $s_1'$, $s_1''$, and $s_1'''$ and the resistor $R_1$. These switches are operated by a control lever of the speed selector unit SSL, so that one or another is closed at a time, depending upon the speed of the paper. Similarly, the speed selector unit SSL is adapted to close one or another of three normally-open switches $Q_4$, $Q_5$ and $Q_6$ in order to connect one or another of three sliders $s_2'$, $s_2''$ and $s_2'''$ of the potentiometer $p_2$. It is to be noted that the sliders $s_2'$, $s_2''$ and $s_2'''$ are arranged to apply a smaller fraction of the voltage to the control grid CG when the speed of the paper is increased. In practice however, it is found that the system may be operated quite satisfactorily without employing the latter set of switches. But when they are employed, these switches $Q_4$, $Q_5$ and $Q_6$ are ganged with the switches $Q_1$, $Q_2$ and $Q_3$ so that one switch in each of the circuits is closed, depending upon the speed of the paper.

While the invention has been described with particular reference to a system in which the electron beam B is deflected only along a deflection axis Y, and an image of the corresponding spot is recorded on a moving strip of photographic paper, it will be understood that the invention is also applicable to a system in which the beam B is periodically deflected along a time axis of the cathode ray tube while being deflected along the deflection axis. Since various means for producing such periodic deflection of the beam along a time axis are well known to those skilled in the art, they are not described here. Suffice it to say, though, that in such a case, a second pair of deflecting plates is employed and a saw-tooth wave or other deflecting signal is applied to this pair of plates in a conventional manner to deflect the beam in a direction transverse to the axis Y.

It is thus seen that I have provided an improved oscilloscope in which oscillograph traces of more uniform contrast can be produced. Though the invention has been described with reference to only one specific embodiment thereof, it will now be understood by those skilled in the art that the invention may be embodied in many other forms without departing from the scope of the invention. It will therefore be understood that many changes may be made therein, such as changes in the nature of the light source, changes in the nature of the recording medium, and changes in the type of traces produced, and that many changes may also be made in the circuits and other specific elements, without departing from the invention as defined by the following claims.

I claim:

1. In an oscilloscope in which an oscillograph trace of variable deflection is produced on a strip of recording medium:

means for generating an electron beam and for projecting said beam onto a screen to produce a spot thereon;

a signal source;

means for applying deflection forces to said beam to deflect said spot along an axis on said screen in accordance with signals from said source;

means for moving a strip of recording medium past a recording zone;

means for projecting an image of said spot onto said recording zone whereby an oscillograph trace is recorded on said strip, the contrast of said trace at any one point relative to the background on said strip depending upon the speed of deflection of said spot along said axis of said screen, upon the intensity of said beam, and upon the scanning speed of said strip;

means for selectively setting the speed of said strip at a relatively high value and at a relatively low value and for simultaneously selectively setting the intensity of said electron beam at a relatively high value and at a relatively low value, said low value being of sufficient intensity to cause the electron beam to produce a spot capable of being recorded on said strip; and additional means controlled by said signals for varying the intensity of said beam as a function of the spot deflection speed whereby changes in contrast of said trace on said strip that would otherwise occur when the beam deflection speed changes are reduced.

2. In an oscilloscope in which an oscillograph trace of variable deflection is produced on a strip of recording medium:

means for generating an electron beam and for projecting said beam onto a screen to produce a spot thereon;

a signal source;

means for applying deflection forces to said beam to deflect said spot along an axis on said screen in accordance with signals from said source;

means for moving a strip of recording medium past a recording zone;

means for projecting an image of said spot onto said recording zone whereby an oscillograph trace is recorded on said strip, the contrast of said trace at any one point relative to the background on said strip depending upon the speed of deflection of said spot along said axis of said screen, upon the intensity of said beam, and upon the scanning speed of said strip;

means for selectively setting the speed of said strip at a relatively high value and at a relatively low value and for simultaneously selectively setting the intensity of said electron beam at a relatively high value and at a relatively low value, said low value being of sufficient intensity to cause the electron beam to produce a spot capable of being recorded on said strip; and separate means controlled by said signals for increasing the intensity of said beam above a normal value when the spot is being deflected whereby changes in contrast of said trace on said strip that would otherwise occur when the beam is being deflected are reduced.

3. In an oscilloscope in which an oscillograph trace of variable deflection is produced on a strip of recording medium:

means for generating an electron beam and for projecting said beam into a screen to produce a spot thereon;

a signal source;

means for applying deflection forces to said beam to deflect said spot along an axis on said screen in accordance with signals from said source;

means for moving a strip of recording medium past a recording zone;

means for projecting an image of said spot onto said recording zone whereby an oscillograph trace is recorded on said strip, the contrast of said trace at any one point relative to the background on said strip depending upon the speed of deflection of said spot along said axis of said screen, upon the intensity of said beam, and upon the scanning speed of said strip;

means for selectively setting the speed of said strip at a relatively high value and at a relatively low value and for simultaneously selectively setting the intensity of said electron beam at a relatively high value and at a relatively low value, said low value being of sufficient intensity to cause the electron beam to produce a spot capable of being recorded on said strip; and means including a differentiator connected to said source and a full wave rectifier controlled by said differentiator for varying the intensity of said beam as a direct function of the spot deflection speed.

4. In an oscilloscope in which an oscillograph trace of variable deflection is produced on a strip of recording medium:

means for generating an electron beam and for projecting said beam onto a luminescent screen to produce a spot thereon;

a signal source;

means for applying deflection forces to said beam to deflect said spot along an axis on said screen in accordance with signals from said source;

means for moving a strip of recording medium past a recording zone;

means for projecting an image of said spot onto said recording zone whereby an oscillograph trace is recorded on said strip, the contrast of said trace at any one point relative to the background on said strip depending upon the intensity of said beam and upon the scanning speed of said strip;

means for selectively setting the speed of said strip at a relatively high value and at a relatively low value and for simultaneously selectively setting the intensity of said electron beam at a relatively high value and at a relatively low value, said low value being of sufficient intensity to cause the electron beam to produce a spot capable of being recorded on said strip; and separate means including a demodulator circuit controlled by said signals for increasing the intensity of said beam when a signal is present whereby loss of contrast of said trace on said strip is reduced.

5. A beam intensifier circuit for a cathode ray tube comprising a cathode ray tube including means for projecting an electron beam and a control electrode for varying the intensity of the beam, a signal source, beam deflection means for applying deflection forces to the beam to deflect the beam in accordance with the signals from the source, rectifying means, having an input and an output differentiating means coupled between the input of the rectifying means and the signal source for differentiating signals having relatively low frequencies, a storage circuit having an input and an output, the input of the storage circuit being connected across the output of the rectifying means, direct current conductive means coupled between the output of the storage circuit and the control grid of the cathode ray tube, the storage circuit being arranged to provide a fluctuating direct current voltage across the output in response to signals from the signal source having relatively high frequencies, the average value of the fluctuating direct current being proportional to the amplitude of the signal, whereby at relatively low frequency signals a voltage proportional to the derivative of the signals is applied to the control electrode to increase the intensity of the beam when it is being deflected and at relatively high frequency signals a fluctuating direct current voltage proportional to the amplitude of the signals is applied to the control grid to provide a high intensity beam for the duration of the high frequency signals.

6. A beam intensifier circuit for a cathode ray tube comprising a cathode ray tube including means for projecting an electron beam and a control electrode for varying the intensity of the beam, a signal source, beam deflection means for applying deflection forces to the beam to deflect the beam in accordance with signals from the source, a full-wave rectifier having an input and output, a differentiator connecting the input of the rectifier to the source, a storage circuit including a resistor connected across the output of the rectifier and a capacitor coupled across at least a portion of the resistor, the storage circuit being arranged to provide a fluctuating direct current voltage across the capacitor in response to a high frequency signal being applied to the rectifier and direct current conductive means coupled between the capacitor and the control electrode whereby the intensity of the beam will be varied in accordance with the frequency and amplitude of the signals from the source.

7. A circuit as defined in claim 6 wherein the storage circuit comprises a potentiometer connected across the output of the rectifier and first and second capacitors connected in series across the potentiometer, the potentiometer including a movable contact, the junction of the capacitors being coupled to the movable contact of the potentiometer, the direct current conductive means being connected to the junction of the capacitors.

8. In an oscilloscope in which a visible oscillograph trace of variable deflection is displayed on a screen; means for generating a variable intensity electron beam and for projecting said beam onto said screen to produce such trace, the contrast of said trace at any point thereof relative to the background of the screen depending upon the speed of the deflection of the beam relative to said screen and upon the intensity of said beam; a signal source; beam deflection means for deflecting said beam from a reference position; an amplifier having an input for receiving signals from said signal source and having an output connected to said beam deflection means for app'ying deflection forces to said beam to deflect said beam in accordance with signals from said source; a full-wave rectifier having an input and an output; means including a differentiator connected between the input of said rectifier and the output of said amplifier and a storage circuit having an input and an output, the input of said storage circuit being connected to the output of said rectifier and the output of said storage circuit being coupled to the means for generating said electron beam to vary the intensity of the beam in accordance with the voltage developed across the output of the storage circuit, the storage circuit being arranged to develop a direct current fluctuating voltage across the output thereof in response to a high frequency signal applied to said rectifier whereby the intensity of said beam will vary as a function of the frequency and amplitude of the signals from said source to thereby reduce the changes in contrast occurring when the beam deflection speed changes.

References Cited in the file of this patent

UNITED STATES PATENTS

| | | |
|---|---|---|
| 2,448,771 | Christaldi | Sept. 7, 1948 |
| 2,700,741 | Brown et al. | Jan. 25, 1955 |
| 2,726,918 | Hathaway et al. | Dec. 13, 1955 |
| 2,828,357 | Fyler et al. | Mar. 25, 1958 |
| 2,860,284 | McKim | Nov. 11, 1958 |